(12) United States Patent
Zhang et al.

(10) Patent No.: US 12,091,293 B2
(45) Date of Patent: Sep. 17, 2024

(54) MAIN HOIST SYSTEM OF ROTARY DRILLING RIG, AND CONTROL METHOD THEREFOR

(71) Applicant: XUZHOU XUGONG FOUNDATION CONSTRUCTION MACHINERY CO., LTD., Xuzhou (CN)

(72) Inventors: Yonghua Zhang, Xuzhou (CN); Yu Sun, Xuzhou (CN); Zhigang Liu, Xuzhou (CN); Changmeng Shan, Xuzhou (CN); Hongchen Qiu, Xuzhou (CN); Xiafang Gao, Xuzhou (CN); Xing Gao, Xuzhou (CN); Junyun Shan, Xuzhou (CN); Qianbin Geng, Xuzhou (CN)

(73) Assignee: XUZHOU XUGONG FOUNDATION CONSTRUCTION MACHINERY CO., LTD., Xuzhou (CN)

( * ) Notice: Subject to any disclaimer, the term of this patent is extended or adjusted under 35 U.S.C. 154(b) by 47 days.

(21) Appl. No.: 17/924,693

(22) PCT Filed: Dec. 3, 2020

(86) PCT No.: PCT/CN2020/133596
§ 371 (c)(1),
(2) Date: Nov. 11, 2022

(87) PCT Pub. No.: WO2021/227452
PCT Pub. Date: Nov. 18, 2021

(65) Prior Publication Data
US 2023/0271814 A1    Aug. 31, 2023

(30) Foreign Application Priority Data

May 12, 2020 (CN) .......................... 202010396624.5

(51) Int. Cl.
 *B66D 1/08* (2006.01)
 *E21B 19/00* (2006.01)
 *F15B 13/044* (2006.01)

(52) U.S. Cl.
 CPC .............. *B66D 1/08* (2013.01); *E21B 19/008* (2013.01); *F15B 13/044* (2013.01)

(58) Field of Classification Search
 CPC . B66D 1/08; E21B 19/008; F15B 2211/20553
 See application file for complete search history.

(56) References Cited

U.S. PATENT DOCUMENTS

| 4,938,296 | A | * | 7/1990 | Brazell, II | .............. | E21B 7/022 173/28 |
| 5,630,477 | A | * | 5/1997 | Minatre | .................... | E21B 7/02 173/147 |

(Continued)

FOREIGN PATENT DOCUMENTS

| CN | 201934087 U | 8/2011 |
| CN | 203584959 U | 5/2014 |

(Continued)

*Primary Examiner* — Thomas E Lazo
(74) *Attorney, Agent, or Firm* — Bayramoglu Law Offices LLC

(57) ABSTRACT

A main winch system of a rotary drilling rig includes a main action loop, a pilot control loop, and a feedback control loop. The main action loop includes an engine, a hydraulic pump, a main control valve, a balance valve, a main winch motor, and an oil tank. The pilot control loop includes a pilot handle, a solenoid valve I, a pressure relay, and the main control valve in the main action loop. The feedback control loop includes a solenoid valve II and the hydraulic pump and the main control valve in the main action loop. In response to a lifting action of the pilot handle for the main winch, under the control of a button, the solenoid valve II is energized continuously, and the solenoid valve I is energized and de-energized according to a given rule.

8 Claims, 1 Drawing Sheet

(56) References Cited

U.S. PATENT DOCUMENTS

| | | | | |
|---|---|---|---|---|
| 6,648,303 | B1* | 11/2003 | Nishimoto | B66D 1/48 254/361 |
| 7,166,061 | B2* | 1/2007 | Shimomura | B66D 1/48 254/377 |
| 7,350,593 | B1* | 4/2008 | Brookover | E21B 44/02 173/4 |
| 8,511,080 | B2* | 8/2013 | Krajnik | F15B 11/165 60/452 |

FOREIGN PATENT DOCUMENTS

| | | |
|---|---|---|
| CN | 204082743 U | 1/2015 |
| CN | 104563855 A | 4/2015 |
| CN | 105041732 A | 11/2015 |
| CN | 205559384 U | 9/2016 |
| CN | 110510536 A | 11/2019 |
| CN | 111115477 A | 5/2020 |
| CN | 111634837 A | 9/2020 |
| WO | 0102736 A1 | 1/2001 |

\* cited by examiner

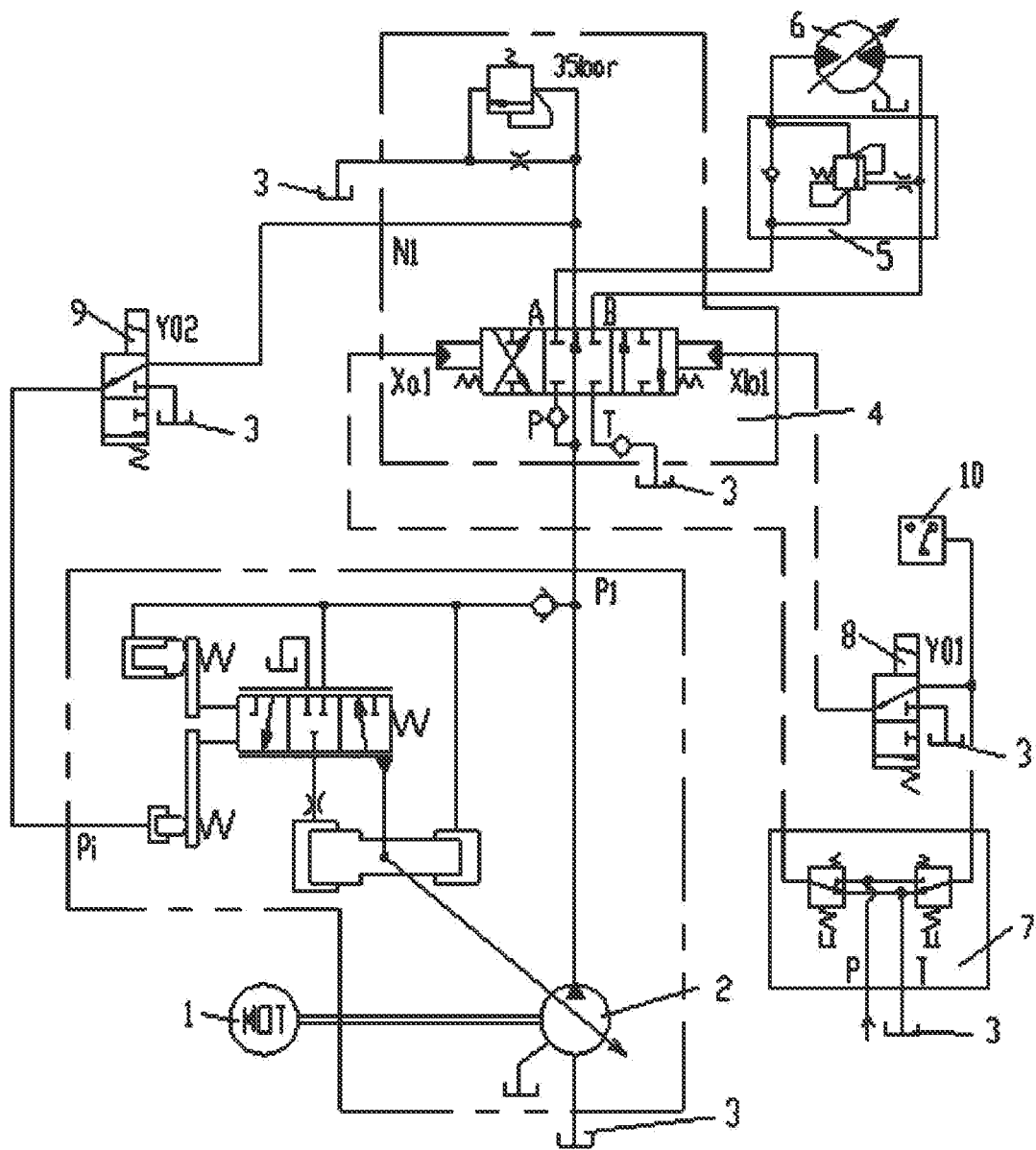

MAIN HOIST SYSTEM OF ROTARY DRILLING RIG, AND CONTROL METHOD THEREFOR

CROSS REFERENCES TO THE RELATED APPLICATIONS

The application is the national phase entry of International Application No. PCT/CN2020/133596, filed on Dec. 3, 2020, which is based on and claims priority to Chinese patent application No. 202010396624.5, filed on May 12, 2020, the entire contents of which are incorporated herein by reference.

TECHNICAL FIELD

The present disclosure belongs to the field of engineering machinery and, in particular, to a main winch system of a rotary drilling rig and a control method thereof. BACKGROUND A rotary drilling rig is piling machinery for boring. At the end of each operating cycle, the rotary drilling rig must throw soil in a drilling tool. However, the cohesive soil attached to an inner wall of the drilling tool cannot fall off spontaneously, and thus, it is necessary to remove the cohesive soil by shaking the drilling tool repeatedly.

Generally, the cohesive soil is shaken off in two ways. The first way is to repeatedly and quickly rotate a power head in forward and reverse directions, such that the soil is shaken off by means of rotational inertia of a drill pipe and repeated collisions between the power head and the drill pipe. The second way is to repeatedly and quickly shake the main winch, such that the soil is shaken off by means of vibrations of a spring on the drill pipe and repeated collisions between the drill pipe and the drill bit.

In the second way, the shaking frequency and amplitude are hardly controlled. In the case of shaking too quickly, the spring on the drill pipe has a small amount of expansion or contraction, and the shaking amplitude is small, thereby causing the dissatisfactory soil-shaking effect. In the case of shaking too slowly, the drill pipe is collided less with the drill bit, which may fail to shake off the soil. The operation frequency of a pilot handle completely depends on the operator. However, it is impossible for manual operation to always keep the same soil shaking frequency and amplitude.

In addition, the second ways has another deficiency as follows: during manual operation, the main control valve is opened and closed repeatedly, such that a displacement of a hydraulic pump changes correspondingly and the action response speed of the main winch is affected. When griping the handle, the operator can feel the response delay and hysteresis of the main winch, causing the dissatisfactory soil-shaking effect.

SUMMARY

Given the defects in the prior art, a technical problem to be solved by the present disclosure is to provide a responsive and effective main winch system of a rotary drilling rig and a control method thereof.

The present disclosure is implemented with the following technical solutions: A main winch system of a rotary drilling rig includes a main action loop, a pilot control loop, and a feedback control loop. The main action loop includes an engine, a hydraulic pump, a main control valve, a balance valve, a main winch motor, and an oil tank. The pilot control loop includes a pilot handle, a solenoid valve I, a pressure relay, and the main control valve in the main action loop. The feedback control loop includes a connecting solenoid valve II and the hydraulic pump and the main control valve in the main action loop.

Further, an oil supply port P1 of the hydraulic pump is connected to a port P of the main control valve. Port A and port B of the main control valve are connected to an oil inlet of the balance valve. An oil outlet of the balance valve is connected to an oil inlet and an oil outlet of the main winch motor. A port T of the main control valve is connected to the oil tank.

The solenoid valve I includes an oil inlet connected to a lifting port of the pilot handle, an oil outlet connected to a lifting pilot port Xb1 of the main control valve, and an oil return port connected to the oil tank. A lowering port of the pilot handle is connected to a lowering pilot port Xa1 of the main control valve. The pressure relay is connected to the lifting port of the pilot handle.

The solenoid valve II includes an oil inlet connected to a feedback port N1 of the main control valve, an oil outlet connected to a feedback port Pi of the hydraulic pump, and an oil return port connected to the oil tank.

Both the solenoid valve I and the solenoid valve II are two-position three-way solenoid valves.

A control method for the main winch system of a rotary drilling rig includes the following methods:

a: reversing the pilot handle to a lifting shift, and controlling, through a button, energization, and de-energization of the solenoid valve I in a cycle; and b: energizing the solenoid valve II continuously, such that the hydraulic pump is maintained at a maximum displacement state all the time.

In step a, when the pilot handle is reversed to the lifting shift, if the solenoid valve I is de-energized, the main control valve is opened, and the hydraulic pump supplies oil to the main winch motor; if the solenoid valve I is energized, the main control valve 4 is closed, and a lifting action for the main winch is stopped.

In step b, when the main control valve is closed, if the solenoid valve II is energized continuously, the feedback port Pi of the hydraulic pump communicates with the oil tank, a feedback pressure is lowered, and the hydraulic pump is maintained at the maximum displacement state.

In step a, the solenoid valve I is energized and de-energized once in each cycle with energization time and de-energization time being different values.

The present disclosure achieves the following advantages: The main winch system of a rotary drilling rig shakes the main winch up and down automatically through the button. The main winch is responsive in action and can shake off the cohesive soil on the drilling tool easily without manual operation. Therefore, the present disclosure reduces the reliance on an operator and improves construction efficiency.

BRIEF DESCRIPTION OF THE DRAWINGS

FIGURE is an overall schematic structural view of the present disclosure

In the FIGURE: 1: engine, 2: hydraulic pump, 3: oil tank, 4: main control valve, 5: balance valve, 6: main winch motor, 7: pilot handle, 8: solenoid valve I, 9: solenoid valve II, and 10: pressure relay.

DETAILED DESCRIPTION OF THE EMBODIMENTS

As shown in the FIGURE, a main winch system of a rotary drilling rig includes a main action loop, a pilot control loop, and a feedback control loop. The main action loop includes engine 1, hydraulic pump 2, main control valve 4, balance valve 5, main winch motor 6, and oil tank 3. The pilot control loop includes pilot handle 7, solenoid valve I 8, pressure relay 10, and the main control valve 4 in the main action loop. The feedback control loop includes connecting solenoid valve II 9 and the hydraulic pump 2 and the main control valve 4 in the main action loop. Both the solenoid valve I 8 and the solenoid valve II 9 are two-position three-way solenoid valves. The present disclosure controls the solenoid valve I 8 through a button, thereby shaking the main winch up and down automatically. The main winch is responsive in action and can shake off the cohesive soil on the drilling tool easily without manual operation. Therefore, the main winch system of a rotary drilling rig reduces the reliance on an operator and improves construction efficiency.

Oil supply port P1 of the hydraulic pump 2 is connected to port P of the main control valve 4. Port A and port B of the main control valve 4 are connected to an oil inlet of the balance valve 5. An oil outlet of the balance valve 5 is connected to an oil inlet and an oil outlet of the main winch motor 6. Port T of the main control valve 4 is connected to the oil tank 3. Therefore, the main action loop is formed.

The solenoid valve I 8 includes an oil inlet connected to a lifting port of the pilot handle 7, an oil outlet connected to lifting pilot port Xb1 of the main control valve 4, and an oil return port connected to the oil tank 3. A lowering port of the pilot handle 7 is connected to lowering pilot port Xa1 of the main control valve 4. The pressure relay 10 is connected to the lifting port of the pilot handle 7 and configured to detect a lifting action. Therefore, the pilot control loop is formed.

The solenoid valve II 9 includes an oil inlet connected to feedback port N1 of the main control valve 4, an oil outlet connected to feedback port Pi of the hydraulic pump 2, and an oil return port connected to the oil tank 3. Therefore, the feedback control loop is formed.

A control method for the main winch system of a rotary drilling rig includes the following steps:
- a: The pilot handle 7 is reversed to a lifting shift. Energization and de-energization of the solenoid valve I 8 in a cycle are controlled through a button. In each cycle, the solenoid valve I 8 is energized and de-energized once. Energization time and de-energization time have different values.
- b: The solenoid valve II 9 is energized continuously, such that the hydraulic pump 2 is maintained at a maximum displacement state all the time.

In Step a, when the pilot handle 7 is reversed to the lifting shift, if the solenoid valve I 8 is de-energized, the lifting port of the pilot handle 7 communicates with the lifting pilot port Xb1 of the main control valve 4, the main control valve 4 is opened, and the hydraulic pump 2 supplies oil to the main winch motor 6. If the solenoid valve I 8 is energized, the lifting pilot port Xb1 of the main control valve 4 communicates with the oil tank 3, the main control valve 4 is closed, and the lifting action for the main winch is stopped.

In Step b, when the main control valve 4 is closed, if the solenoid valve II 9 is de-energized, the feedback port N1 of the main control valve 4 communicates with the feedback port Pi of the hydraulic pump, a feedback pressure is applied to the feedback port Pi of the hydraulic pump 2, and the hydraulic pump 2 is maintained at a minimum displacement state. If the solenoid valve II 9 is energized, the feedback port Pi of the hydraulic pump 2 communicates with the oil tank 3, the feedback pressure is lowered, and the hydraulic pump 2 is maintained at the maximum displacement state.

In response to the lifting action of the pilot handle for the main winch, the two-position three-way solenoid valve 8 is energized and de-energized according to a given rule under the control of the button. Therefore, the pilot oil passage in a lifting direction is connected and disconnected continuously, the main winch is lifted and stopped repeatedly, and a drilling tool suspended on the main winch shakes up and down according to a certain rule, thereby shaking off the cohesive soil on the drilling tool easily to achieve a soil shaking effect. During the soil shaking process, the solenoid valve 9 is energized continuously, such that the hydraulic pump 2 is maintained at the maximum displacement state. If the main control valve 4 is opened and closed repeatedly in the soil shaking process, both the feedback pressure and the displacement of the hydraulic pump 2 change correspondingly, such that the action response speed of the main winch is affected to achieve the dissatisfactory soil shaking effect.

What is claimed is:

1. A main winch system of a rotary drilling rig, comprising a main action loop, a pilot control loop, and a feedback control loop, wherein the main action loop comprises an engine, a hydraulic pump, a main control valve, a balance valve, a main winch motor, and an oil tank; the pilot control loop comprises a pilot handle, a first solenoid valve, a pressure relay, and the main control valve in the main action loop; and the feedback control loop comprises a connecting second solenoid valve and the hydraulic pump and the main control valve in the main action loop, wherein the first solenoid valve comprises an oil inlet connected to a lifting port of the pilot handle, an oil outlet connected to a lifting pilot port of the main control valve, and an oil return port connected to the oil tank; a lowering port of the pilot handle is connected to a lowering pilot port of the main control valve; and the pressure relay is connected to the lifting port of the pilot handle.

2. The main winch system according to claim 1, wherein an oil supply port of the hydraulic pump is connected to a first port of the main control valve; a second port and a third port of the main control valve are connected to an oil inlet of the balance valve; an oil outlet of the balance valve is connected to an oil inlet and an oil outlet of the main winch motor; and a return port of the main control valve is connected to the oil tank.

3. The main winch system according to claim 1, wherein the connecting second solenoid valve comprises an oil inlet connected to a feedback port of the main control valve, an oil outlet connected to a feedback port of the hydraulic pump, and an oil return port connected to the oil tank.

4. A main winch system of a rotary drilling rig comprising a main action loop, a pilot control loop, and a feedback control loop, wherein the main action loop comprises an engine, a hydraulic pump, a main control valve, a balance valve, a main winch motor, and an oil tank; the pilot control loop comprises a pilot handle, a first solenoid valve, a pressure relay, and the main control valve in the main action loop; and the feedback control loop comprises a connecting second solenoid valve and the hydraulic pump and the main control valve in the main action loop, wherein both the first solenoid valve and the connecting second solenoid valve are a two-position three-way solenoid valve.

5. A control method of a main winch system of a rotary drilling rig, the main which system including a main action loop, a pilot control loop, and a feedback control loop, wherein the main action loop comprises an engine, a hydraulic pump, a main control valve, a balance valve, a main winch motor, and an oil tank; the pilot control loop comprises a pilot handle, a first solenoid valve, a pressure relay, and the main control valve in the main action loop; and the feedback control loop comprises a connecting second solenoid valve and the hydraulic pump and the main control valve in the main action loop;

the control method comprising:
- a: reversing the pilot handle to a lifting shift, and controlling, through a button, energization and de-energization of the first solenoid valve in a cycle; and
- b: energizing the connecting second solenoid valve continuously to maintain the hydraulic pump at a maximum displacement state.

6. The control method according to claim 5, wherein in step a, when the pilot handle is reversed to the lifting shift, if the first solenoid valve is de-energized, the main control valve is opened, and the hydraulic pump supplies oil to the main winch motor; and if the first solenoid valve is energized, the main control valve is closed, and a lifting action for a main winch is stopped.

7. The control method according to claim 5, wherein in step b, when the main control valve is closed and the connecting second solenoid valve is energized continuously, the feedback port Pi of the hydraulic pump communicates with the oil tank, a feedback pressure is lowered, and the hydraulic pump is maintained at the maximum displacement state.

8. The control method according to claim 5, wherein in step a, the first solenoid valve is energized and de-energized once in each cycle, and energization time and de-energization time are different.

* * * * *